(12) United States Patent
Masui

(10) Patent No.: US 9,785,386 B2
(45) Date of Patent: Oct. 10, 2017

(54) IMAGE PROCESSING APPARATUS, CASE PROCESSING APPARATUS, AND IMAGE PROCESSING METHOD FOR PROCESSING AN APPLICATION BASED ON AN AGENT REQUESTED IN ADVANCE FROM AN APPLICANT TO PROCEED WITH THE APPLICATION PROCEDURE

(71) Applicant: FUJI XEROX CO., LTD., Tokyo (JP)

(72) Inventor: Takanori Masui, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/747,541

(22) Filed: Jun. 23, 2015

(65) Prior Publication Data

US 2015/0286449 A1 Oct. 8, 2015

Related U.S. Application Data

(63) Continuation of application No. PCT/JP2013/072200, filed on Aug. 20, 2013.

(30) Foreign Application Priority Data

Mar. 8, 2013 (JP) ................................ 2013-046392

(51) Int. Cl.
*G06F 15/00* (2006.01)
*G06F 3/12* (2006.01)
*G06Q 10/06* (2012.01)

(52) U.S. Cl.
CPC .......... *G06F 3/1222* (2013.01); *G06F 3/1238* (2013.01); *G06F 3/1285* (2013.01); *G06Q 10/06* (2013.01)

(58) Field of Classification Search
None
See application file for complete search history.

(56) References Cited

U.S. PATENT DOCUMENTS 7,813,962 B2* 10/2010 Christ, Jr. ............ G06Q 10/087
705/26.1
2005/0144469 A1* 6/2005 Saitoh ................... G06F 21/608
713/189

(Continued)

FOREIGN PATENT DOCUMENTS

CN 101651764 A 2/2010
CN 102903171 A 1/2013

(Continued)

OTHER PUBLICATIONS

ISR (PCT/ISA/210), issued Nov. 19, 2013, in related International Application No. PCT/JP2013/072200.

(Continued)

*Primary Examiner* — Helen Q Zong
(74) *Attorney, Agent, or Firm* — Sughrue Mion, PLLC

(57) ABSTRACT

An image processing apparatus includes: an identification information receiving unit that receives identification information of an agent who was requested in advance from an applicant to proceed with an application procedure for processing a case instead, the application procedure requesting an approval by an approver; an authorizer information receiving unit that receives information about the applicant who requested in advance the agent of the received identification information to proceed with the application procedure instead; an image acquisition unit that acquires an image; and a transmission unit that transmits the acquired image as an image relating to the applicant based on a transmission instruction from the agent.

20 Claims, 12 Drawing Sheets

(56) References Cited

U.S. PATENT DOCUMENTS

| | | | |
|---|---|---|---|
| 2005/0222944 A1 | 10/2005 | Dodson, Jr. et al. | |
| 2008/0231909 A1* | 9/2008 | Nakamura | H04N 1/00244 358/403 |
| 2010/0039659 A1* | 2/2010 | Suzuki | G06F 17/30011 358/1.14 |
| 2012/0099150 A1 | 4/2012 | Asamoto et al. | |

FOREIGN PATENT DOCUMENTS

| | | | |
|---|---|---|---|
| JP | 2000315234 A | * | 11/2000 |
| JP | 2006-79403 A | | 3/2006 |
| JP | 2008152595 A | | 7/2008 |
| JP | 2008-225958 A | | 9/2008 |
| JP | 2008234592 A | | 10/2008 |
| JP | 2009-187498 A | | 8/2009 |
| JP | 2010049531 A | | 3/2010 |
| JP | 2011-34449 A | | 2/2011 |
| JP | 2011034449 A | | 2/2011 |
| JP | 2012-89033 A | | 5/2012 |
| JP | 2012089033 A | | 5/2012 |

OTHER PUBLICATIONS

Written Opinion (PCT/ISA/237), issued Nov. 19, 2013, in related International Application No. PCT/JP2013/072200.

Office Action dated Sep. 5, 2014 issued by the Japanese Patent Office in counterpart Japanese Patent Application No. 2013-046392.

Office Action dated Jan. 28, 2015 issued by the Japanese Patent Office in counterpart Japanese Patent Application No. 2013-046392.

Notification of Reason for Refusal issued on Apr. 12, 2016, issued by the Japanese Intellectual Property Office in counterpart Japanese Application No. 2015-089508.

Masanobu Ohara, "Travel expense settlement system—TABI CALC", Travel calc C/S standard version, Commentary Operation Manual, by Hitachi Government & Public Sector Systems, Ltd., Aug. 31, 1999, Total 61 pages.

Communication dated Nov. 19, 2013 issued by International Searching Authority in counterpart International Patent Application No. PCT/JP2013/072200.

"Traveling-Expenses Balancing Account System", Trip—Light—Trip—Light—C/S Standard Version Application Description / Operation Document, Japan, Hitachi public engineering incorporated company, Aug. 31, 1999, 2nd edition, Total 35 pages.

Office Action dated Nov. 4, 2016, issued by the Japanese Intellectual Property Office in counterpart Japanese Application No. 2015-089508.

Communication dated May 25, 2017 issued by the State Intellectual Property Office of P.R.C. in counterpart Chinese Patent Application No. 201380070803.8.

* cited by examiner

4: IMAGE PROCESSING APPARATUS

6: APPLICATION PROCESSING APPARATUS

FIG. 11

LOG-IN USER NAME : AAA

ITEMS OF EXPENSE ADJUSTMENT APPLICATIONS
(TARGET OF ADJUSTMENT PROCESSING : BBB)

| Nov 22, 2012 | TRAIN (TOKYO-OSAKA) | ¥13,240 | ⚠ |
| Nov 23, 2012 | HOTEL (OSAKA) | ¥25,600 | ⚠ |
| Nov 23, 2012 | FLIGHT (OSAKA-OKINAWA) | ¥40,000 | ✓ |
| Nov 25, 2012 | HOTEL (OKINAWA) | ¥25,600 | ✓ |
| Nov 25, 2012 | FLIGHT (OKINAWA-TOKYO) | ¥50,000 | ✓ |

170, 172, 174

FIRST PAGE / TOTAL OF THREE PAGES

FIG. 12

LOG-IN USER NAME : AAA

READING CONDITION SETTING

SELECTED ITEM OF EXPENSE ADJUSTMENT APPLICATION

Nov 22, 2012    TRAIN (TOKYO-OSAKA)    ¥13,240

ONE-SIDED READING/DOUBLE-SIDED READING: ONE-SIDED

COLOR READING/MONOCHROME READING: AUTOMATIC DETERMINATION

IMAGE DATA FORMAT: PDF

RESOLUTION: 200dpi

STOP    START READING

IMAGE PROCESSING APPARATUS, CASE PROCESSING APPARATUS, AND IMAGE PROCESSING METHOD FOR PROCESSING AN APPLICATION BASED ON AN AGENT REQUESTED IN ADVANCE FROM AN APPLICANT TO PROCEED WITH THE APPLICATION PROCEDURE

CROSS REFERENCE TO RELATED APPLICATION

This is a continuation of International Application No. PCT/JP2013/072200 filed on Aug. 20, 2013, and claims priority from Japanese Patent Application No. 2013-046392, filed on Mar. 8, 2013.

BACKGROUND

Technical Field

The present invention relates to an image processing apparatus, a case processing apparatus and an image processing method.

SUMMARY

An aspect of the present invention provides an image processing apparatus includes: an identification information receiving unit that receives identification information of an agent who was requested in advance from an applicant to proceed with an application procedure for processing a case instead, the application procedure requesting an approval by an approver; an authorizer information receiving unit that receives information about the applicant who requested in advance the agent of the received identification information to proceed with the application procedure instead; an image acquisition unit that acquires an image; and a transmission unit that transmits the acquired image as an image relating to the applicant based on a transmission instruction from the agent.

BRIEF DESCRIPTION OF THE DRAWINGS

Exemplary embodiment(s) of the present invention will be described in detail based on the following figures, wherein:

FIG. 11 is a diagram schematically showing an example of a display screen of the UI device 11, which is displayed by being controlled by the display control unit 76, according to the second embodiment;

FIG. 12 is a diagram schematically showing an example of a setting screen which is displayed on the UI device 11 before the image reading device 14 reads an evidential document according to the second embodiment;

DETAILED DESCRIPTION

Hereinafter, a detailed description will be given of a first embodiment of the invention with reference to drawings.

Figure 1:
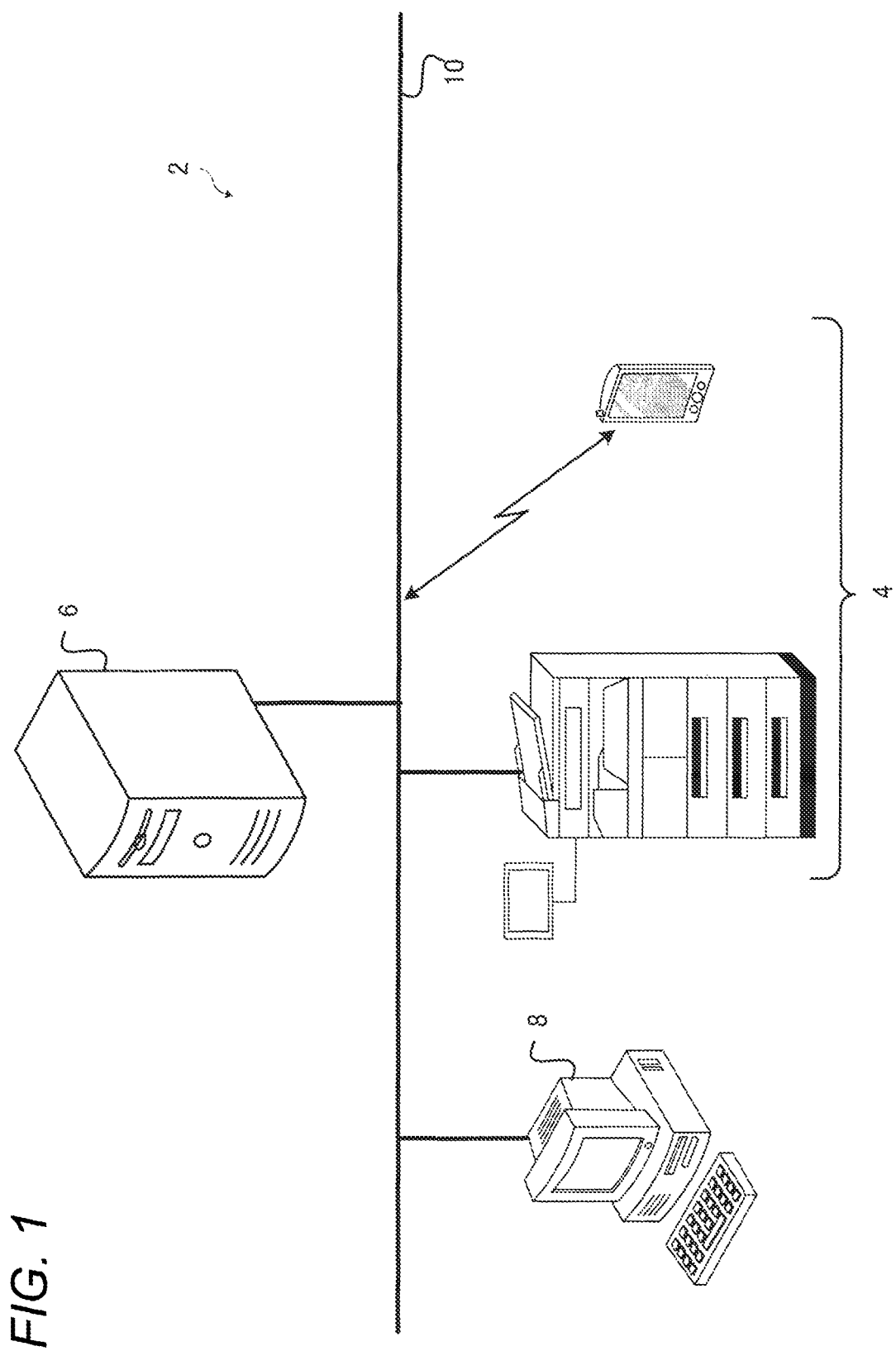
FIG. 1 is a diagram schematically showing an application processing system 2 according to an embodiment of the invention.

FIG. 1 is a diagram schematically showing an application processing system 2 according to the first embodiment of the invention. As shown in FIG. 1, the application processing system 2 includes an image processing apparatus 4, an application processing apparatus 6, and a terminal apparatus 8, and the respective apparatuses are connected to a network 10 such as a LAN, a WAN, or the Internet. The application processing system 2 is a system for processing applications. Specifically, the application processing system 2 performs processing of acquiring an image as an evidential document for a registered application and approving the application. In this embodiment, a description will be given of an example in which the application processing system 2 acquires an image of a receipt or the like as an evidential document for an application of expense adjustment and adjustment processing is performed.

The image processing apparatus 4 is an apparatus which acquires the image as the evidential document required for processing the application and is provided with an image reading device, such as a scanner, for reading the evidential document, an imaging device, such as a camera, for imaging the evidential document, or the like. In this embodiment, a description will be given of an image formation apparatus provided with the image reading device, as an example of the image processing apparatus 4.

Figure 2:
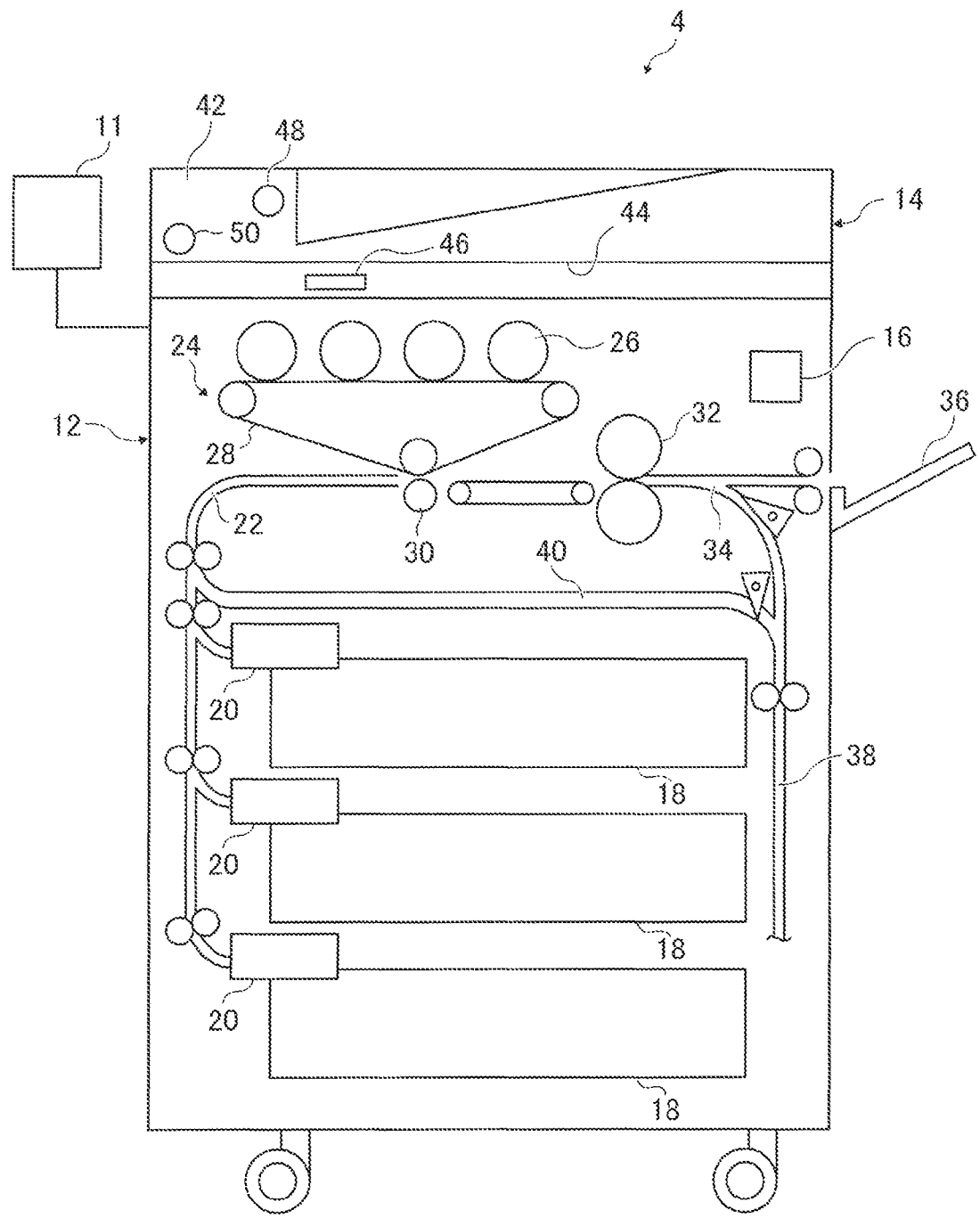
FIG. 2 is a cross-sectional view showing an image processing apparatus 4 according to the embodiment of the invention.

FIG. 2 is a cross-sectional view showing the image processing apparatus 4. The image processing apparatus 4 includes a UI device 11, a printing device 12, an image reading device 14, and a communication device 16.

The UI device 11 is a device including a display device for displaying information and an input receiving device for receiving input from an operator and is configured of a touch panel, for example. The operator can input their identification information such as an ID via the UI device 11. In addition, the UI device 11 may acquire the identification information of the operator stored on a recording medium by reading the recording medium such as an IC card or may acquire the identification information through an input operation by the operator. In addition, the UI device 11 may acquire a password or the like in addition to the identification information.

The printing device 12 is a device for performing printing. The printing device 12 includes three recording medium supply cassettes 18, for example, and a supply head 20 is provided in each of the recording medium supply cassettes 18.

If one of the recording medium supply cassettes 18 is selected, the supply head 20 is operated, and a recording medium such as paper is supplied from the selected recording medium supply cassette 18 to an image formation mechanism unit 24 via a recording medium supply path 22.

In the image formation mechanism unit 24, the respective photoreceptors 26 for yellow, magenta, cyan, and black are provided together, and an intermediate transfer belt 28 is provided.

In the circumference of the respective photoreceptors 26, an electrical charge device, an exposure device, a developing device, a primary transfer device, a cleaning device, and the like (not shown) are arranged, and a toner image formed on the respective photoreceptors 26 is transferred to the intermediate transfer belt 28. In a case of a monochrome setting, only the photoreceptor for black can operate.

The toner image on the intermediate transfer belt 28 is transferred to a recording medium which is fed by a secondary transfer roll 30 and is fixed by a fixation device 32, and the recording medium with the toner image fixed thereon passes through a recording medium discharge path 34 and is discharged to a discharge unit 36.

However, in a case where double-sided printing is set, the recording medium with an image fixed on a surface thereof by the fixation device 32 is fed from the recording medium discharge path 34 to an inverting device 38, is inverted by the inverting device 38, is fed to a recording medium inverting path 40, is fed back to the recording medium supply path 22 again, and is fed to the image formation mechanism unit 24, and printing is performed on the rear surface thereof.

The image reading device 14 includes an automatic original document feeding device 42 capable of reading an original document of double-sided printing, the original document is fed to a platen 44 by the automatic original document feeding device 42, and images of the original document are read by a reading unit 46, such as a CCD, on the platen 44.

The automatic original document feeding device 42 is provided with an original document setting detector 48 for detecting whether or not an original document has been set. In addition, the automatic original document feeding device 42 also functions as a platen cover, and the original document can be placed on the platen 44 by opening the platen cover. Opening and closing of the platen cover can be detected by a platen cover opening and closing detector 50.

The communication device 16 is a device for communicating with an external device via a network 10 and is configured of a data line terminating device, for example. The image processing apparatus 4 transmits image data which is read by the image reading device 14 to the application processing apparatus 6 and exchanges information with the application processing apparatus 6, for example.

Figure 3:
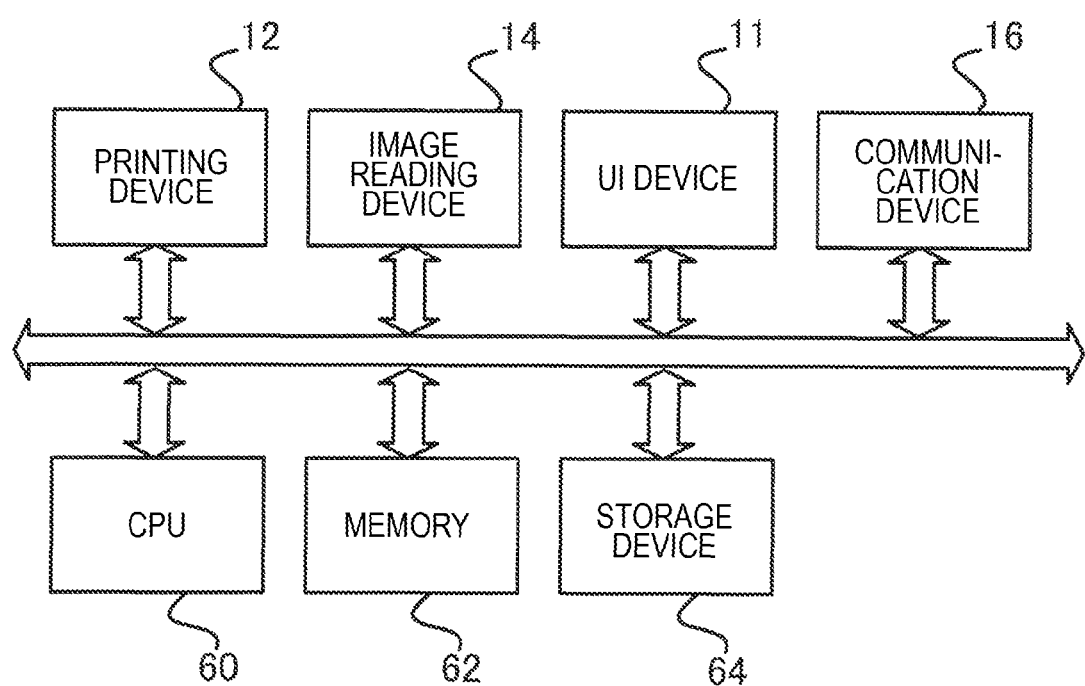
FIG. 3 is a block diagram showing a hardware configuration of the image processing apparatus 4 according to the embodiment of the invention.

FIG. 3 is a block diagram showing a hardware configuration of the image processing apparatus 4.

As shown in FIG. 3, the image processing apparatus 4 has a configuration in which a CPU 60, a memory 62, and a storage device 64 are connected via a bus as well as the aforementioned printing device 12, the image reading device 14, the UI device 11, and the communication device 16.

As described above, the image processing apparatus 4 includes a component as a computer which is capable of communicating with other devices via the network 10.

The CPU 60 controls operations of the image processing apparatus 4 by executing a program written in the memory 62 or the storage device 64. In addition, an input received via the UI device 11 is delivered to the CPU 60, and display information from the CPU 60 is delivered to the UI device 11.

In addition, the CPU 60 may execute a program stored on a portable storage medium such as a CD-ROM, which is not shown in the drawing, or may execute a program which is provided through the communication device 16.

The storage device 64 stores data on a hard disk, for example, in a writable and readable manner.

Figure 4:
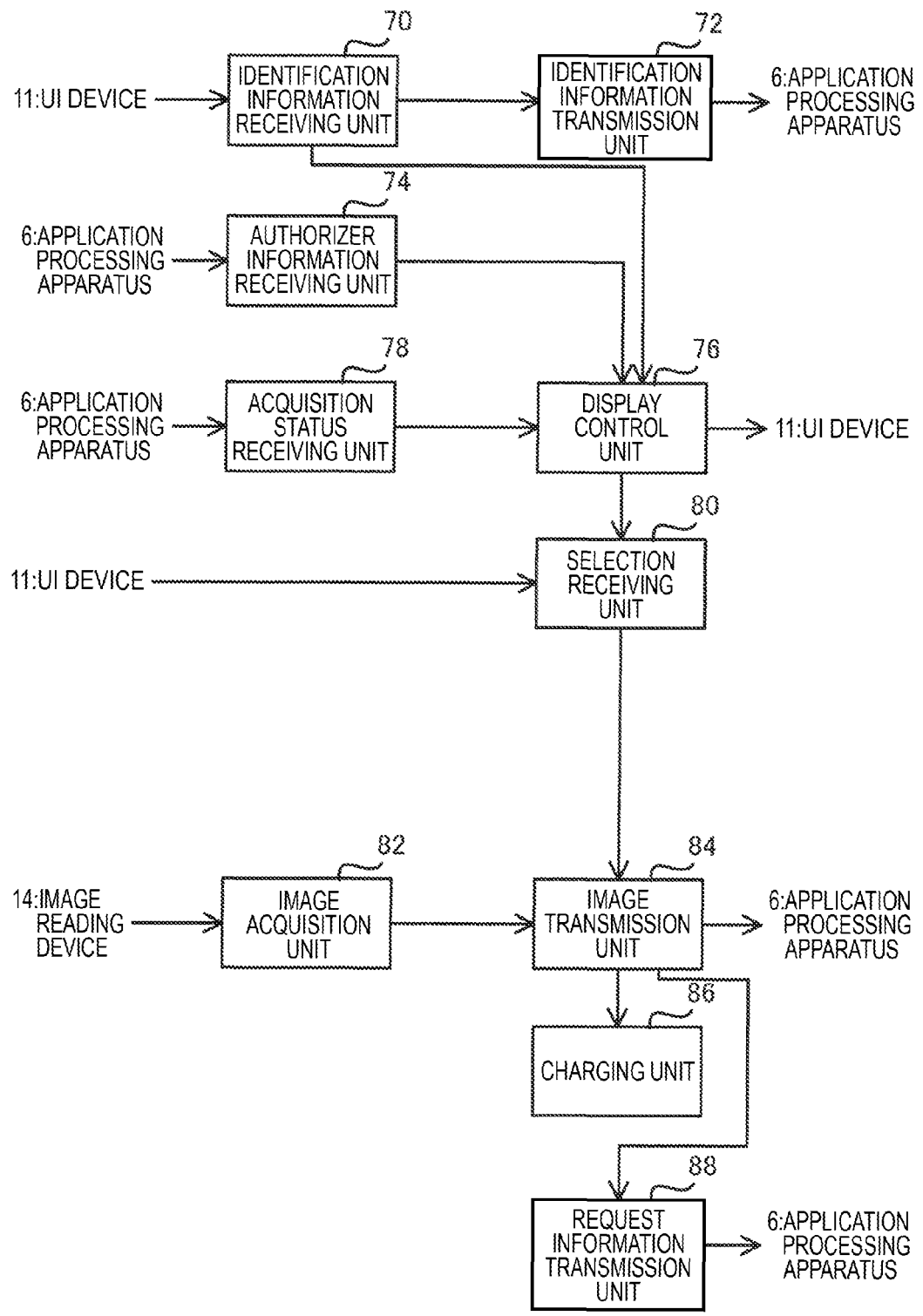
FIG. 4 is a block diagram showing a functional configuration of the image processing apparatus 4, which is implemented by a program being executed, according to a first embodiment.

FIG. 4 is a block diagram showing a functional configuration of the image processing apparatus 4 which is implemented by a program being executed.

The image processing apparatus 4 according to the embodiment includes an identification information receiving unit 70, an identification information transmission unit 72, an authorizer information receiving unit 74, a display control unit 76, an acquisition status receiving unit 78, a selection receiving unit 80, an image acquisition unit 82, an image transmission unit 84, a charging unit 86, and a request information transmission unit 88 as shown in FIG. 4.

The identification information receiving unit 70 receives identification information, such as a name or an ID of a user, which is inputted via the UI device 11. According to the embodiment, the identification information receiving unit 70 receives password information, which is inputted via the UI device 11, along with the identification information.

The identification information transmission unit 72 transmits the identification information of the user, which is received by the identification information receiving unit 70. According to the embodiment, the identification information transmission unit 72 transmits the password information along with the identification information to the application processing apparatus 6 and performs processing of logging in to the application processing apparatus 6.

The authorizer information receiving unit 74 receives information about an authorizer (which is an example of applicant). Specifically, the authorizer information receiving unit 74 receives information about an authorizer who authorizes the user (which is an example of agent) of the identification information, which is received by the identification information receiving unit 70, to proceed with a procedure necessary for application approval processing. According to the embodiment, the authorizer information receiving unit 74 receives, from the application processing apparatus 6, information about an authorizer who authorizes an authorized person (which is an example of agent) to proceed with a procedure of submitting an image of a receipt required for the approval processing of the expense adjustment application. According to the embodiment, the authorizer information receiving unit 74 receives identification information of the authorizer as information about the authorizer. In addition, the authorizer information receiving unit 74 may additionally acquire information about the authority of the authorized person to proceed with the procedure instead.

In a case where an authorizer BBB authorizes an authorized person AAA to proceed with a procedure for an application relating to the authorizer BBB, for example, the authorizer information receiving unit 74 receives identification information of the authorizer BBB when the authorized person AAA inputs the identification information via the UI device 11. In a case where there are other authorizers who are different from the authorizer BBB and authorize the authorized person AAA, the authorizer information receiving unit 74 also acquires identification information of these authorizers.

The display control unit 76 controls the UI device 11, as the display device, to display the information which is received by the authorizer information receiving unit 74.

Figure 5A:
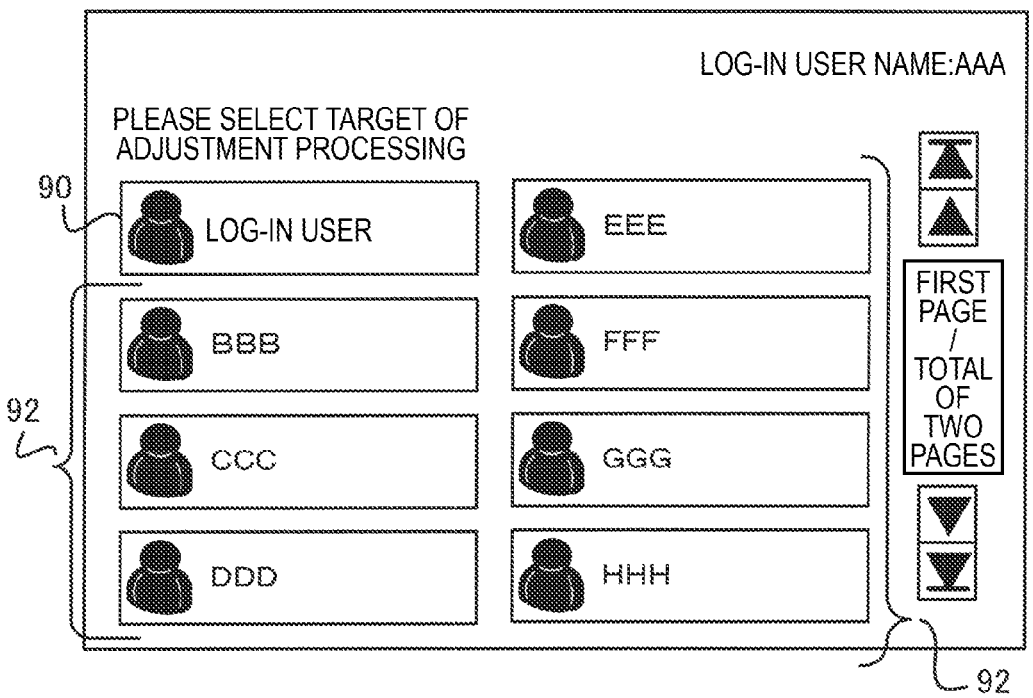
FIG. 5A is a diagram schematically showing an example of a display screen of a UI device 11, which is displayed by being controlled by a display control unit 76, and shows a display example in a case where an evidential document acquisition status is not reflected.
Figure 5B:
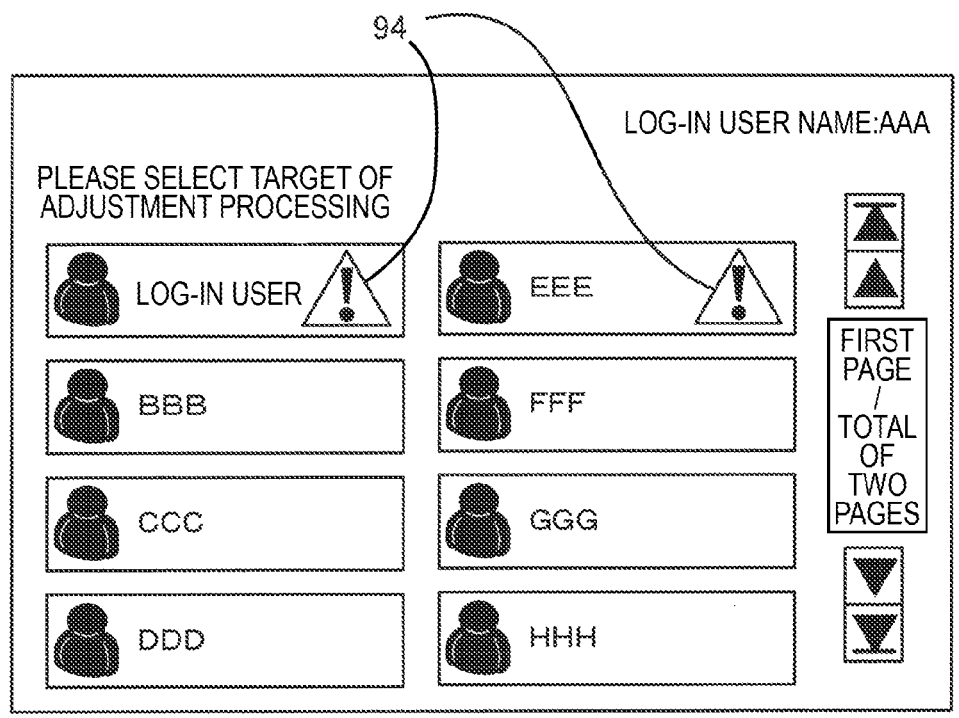
FIG. 5B is a diagram schematically showing an example of a display screen of the UI device 11, which is displayed by being controlled by the display control unit 76, and shows a display example in a case where the evidential document acquisition status is reflected.

FIGS. 5A and 5B are diagrams schematically showing examples of display screens of the UI device 11, which are displayed by being controlled by the display control unit 76. Specifically, FIG. 5A shows a display example in a case where an evidential document acquisition status is not reflected, and FIG. 5B shows a display example in a case where the evidential document acquisition status is reflected. In the examples shown in FIGS. 5A and 5B, the identification information of the authorizers which are received by the authorizer information receiving unit 74 are displayed along with the identification information which is received by the identification information receiving unit 70. In FIGS. 5A and 5B, a displayed image 90 indicates identification information of the operator themselves which is received by the identification information receiving unit 70, and a displayed image 92 indicates identification information of the authorizers which is received by the authorizer information receiving unit 74. Here, the display control unit 76 may display the identification information of the authorizers on plural pages as shown in FIGS. 5A and 5B. In such a case, another page is displayed by shifting the screen.

According to the embodiment, the display control unit 76 performs control so as to display, with information of the user which is received by the identification information receiving unit 70 and the information received by the authorizer information receiving unit 74, an evidential document image acquisition status relating to the information as shown in FIG. 5B. In the example shown in FIG. 5B, a display image 94 indicating that there is an application for which a receipt has not been submitted is displayed along with the identification information of the user and the authorizers when there is an application for which a receipt has not been submitted from among expense adjustment applications from the user and the authorizers. Although the example in which the display image 94 indicating that there is an application for which a receipt has not been submitted is displayed along with the identification information of the authorizers is shown in the example in FIG. 5B, a configuration is also applicable in which a fact that a receipt has already been submitted is explicitly displayed.

The acquisition status receiving unit 78 receives information relating to an acquisition status of an evidential document image to be referred to for the application approval processing. According to the embodiment, the acquisition status receiving unit 78 receives information on whether or not the image of the receipt required for approval of the expense adjustment application has been acquired from the application processing apparatus 6. Here, the acquisition status receiving unit 78 according to the embodiment receives information indicating whether or not there is an application, for which a receipt has not yet been submitted, from among applications relating to the user and the authorizers as an acquisition status for each of the user and the authorizers.

In addition, the display control unit 76 may perform control so as to display information, an image of which has not yet been acquired according to the acquisition status received by the acquisition status receiving unit 78, with priority from among the information received by the authorized information receiving unit 74. In a case where the information received by the authorizer information receiving unit 74 is identification information of the authorizers as in the embodiment, for example, control may be made such that identification information of authorizers who have not yet submitted some receipts for their applications is displayed with priority as compared with identification information of authorizers who have already submitted all receipts for their applications. For example, the identification information of such authorizers may be displayed on the first page of the display screen.

The selection receiving unit 80 receives a selecting operation performed on information being displayed by the display control unit 76. According to the embodiment, the selection receiving unit 80 receives a selecting operation which is performed via the UI device 11 on the identification information of the authorizers being displayed by the display control unit 76. The operator who is the authorized person selects one of the authorizers for whom the operator acquires an image of a receipt instead of from a list of the identification information of the authorizers being displayed as shown in FIGS. 5A and 5B. In a case where the operator acquires an image of a receipt for their own expense adjustment application, the operator selects their own identification information from the identification information being displayed on the display screen shown in FIGS. 5A and 5B. In such a case, the selection receiving unit 80 receives an operation of selecting the identification information of the operator themselves.

The image acquisition unit 82 acquires an image. According to the embodiment, the image acquisition unit 82 acquires an evidential document image to be referred to for application approval processing. For example, the image acquisition unit 82 acquires image data of a receipt, which is read by the image reading device 14, from the image reading device 14.

Figure 6:
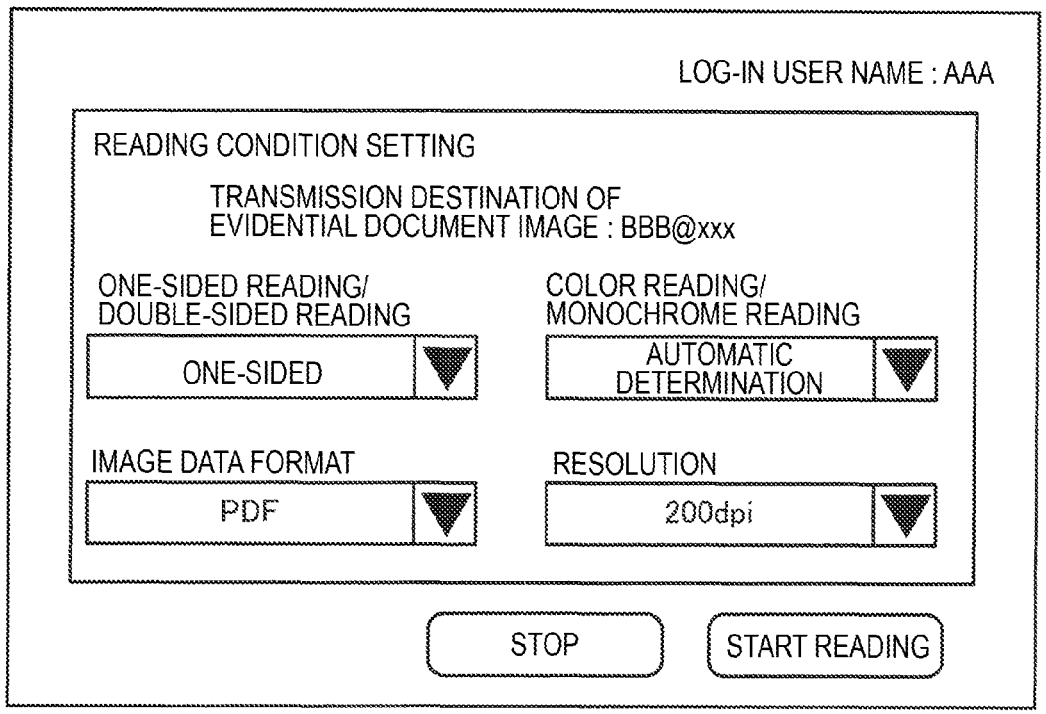
FIG. 6 is a diagram schematically showing an example of a setting screen which is displayed on the UI device 11 before an image reading device 14 reads an evidential document.

FIG. 6 is a diagram schematically showing an example of a setting screen displayed by the UI device 11 when the image reading device 14 reads an evidential document. In the example shown in FIG. 6, a screen in a case where the authorized person AAA as the operator reads the evidential document for application relating to the authorizer BBB is exemplified, and the operator can set an evidential document reading condition based on the screen. In FIG. 6, a case where read image data is transmitted to BBB@xxx as an address unique to the authorizer BBB is exemplified, and the address of the transmission destination is displayed on the screen.

The image transmission unit 84 transmits the image acquired by the image acquisition unit 82 as an image relating to the authorizer, the information of which is received by the authorizer information receiving unit 74. According to the embodiment, the image transmission unit 84 transmits the image of the receipt acquired by the image acquisition unit 82 to the application processing apparatus 6 as an evidential document for the authorizer, which is specified by the selecting operation received by the selection receiving unit 80. In a case where a transmission destination address of an evidential document image differs for each applicant, for example, the image transmission unit 84 transmits the image data to a transmission destination address unique to an authorizer, which is specified by the selecting operation received by the selection receiving unit 80. For this reason, the evidential document is collected even if the operation is performed by a person other than the applicant themselves. According to the embodiment, the image transmission unit 84 performs the transmission based on a transmission instruction input from the user via the UI device 11, for example.

A method of transmitting the evidential document relating to the authorizer, the information of which is received by the authorizer information receiving unit 74, by the image transmission unit 84 is not limited to the aforementioned example in which the evidential document is transmitted to the transmission destination address unique to the authorizer, and another method may be employed. In a case where storage regions of evidential document images are separately provided for each applicant in the application processing apparatus 6, for example, the image transmission unit 84 may transmit image data such that the image data is stored on a storage region unique to the authorizer who is specified by the selecting operation received by the selection receiving unit 80. For example, position information of the storage region unique to the authorizer is acquired as information received by the authorizer information receiving unit 74. In addition, the image transmission unit 84 may provide notification that the image data is image data relating to the authorizer specified by the selecting operation received by the selection receiving unit 80 to the application processing apparatus 6 in addition to transmitting the image data. In such a case, the application processing apparatus 6 sorts the image data to the storage region unique to the authorizer based on the identification information of the authorizer of the notification.

The charging unit 86 charges in accordance with acquisition of an image by the image acquisition unit 82. The charging unit 86 accumulates prices in accordance with acquisition of images by the image acquisition unit 82. In addition, the charging unit 86 may charge every time the image acquisition unit 82 acquires an image or may charge every time the number of times the image acquisition unit 82 acquires an image reaches a predetermined number of times. Although the embodiment is described on the assumption that the charging unit 86 is included as a function of the image processing apparatus 4, the charging unit 86 may be included as a function of the application processing apparatus 6.

The request information transmission unit 88 transmits information for requesting to execute approval processing of the application, for which the evidential document image to be referred to for the approval processing has already been acquired. Although the request information transmission unit 88 transmits information for requesting to execute the expense adjustment processing to the application processing apparatus 6 in the embodiment, the information may be transmitted to another apparatus. For example, the information may be transmitted to a terminal apparatus or the like which is used by an approver in order to provide notification to the approver of the expense adjustment.

Next, a description will be given of the application processing apparatus 6.

Figure 7:
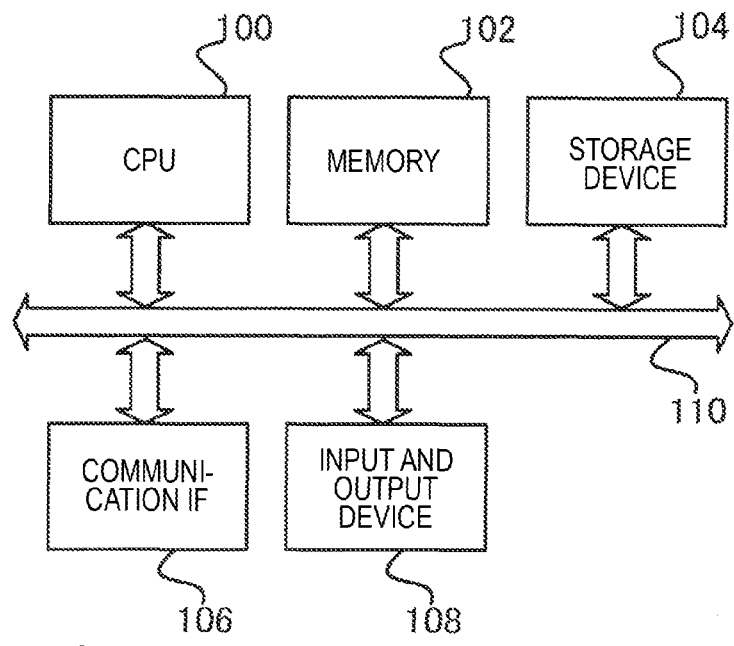
FIG. 7 is a block diagram showing an example of a hardware configuration of an application processing apparatus 6 according to the embodiment of the invention.

FIG. 7 is a block diagram showing an example of a hardware configuration of the application processing apparatus 6.

The application processing apparatus 6 is a server provided with a CPU 100, a memory 102, a storage device 104 such as a hard disk drive (HDD), a communication interface (IF) 106 which transmits and receives data to and from an external apparatus or the like via the network 10, and an input and output device 108 as shown in FIG. 7. These components are connected to each other via a control bus 110.

The CPU 100 executes processing based on a program stored on the memory 102 or the storage device 104 and controls operations of the application processing apparatus 6.

Although the description is given on the assumption that the CPU 100 reads and executes the program stored on the memory 102 or the storage device 104 in the embodiment, it is also possible to provide the program to the CPU 100 in a state of being stored on a storage medium such as a CD-ROM.

Figure 8:
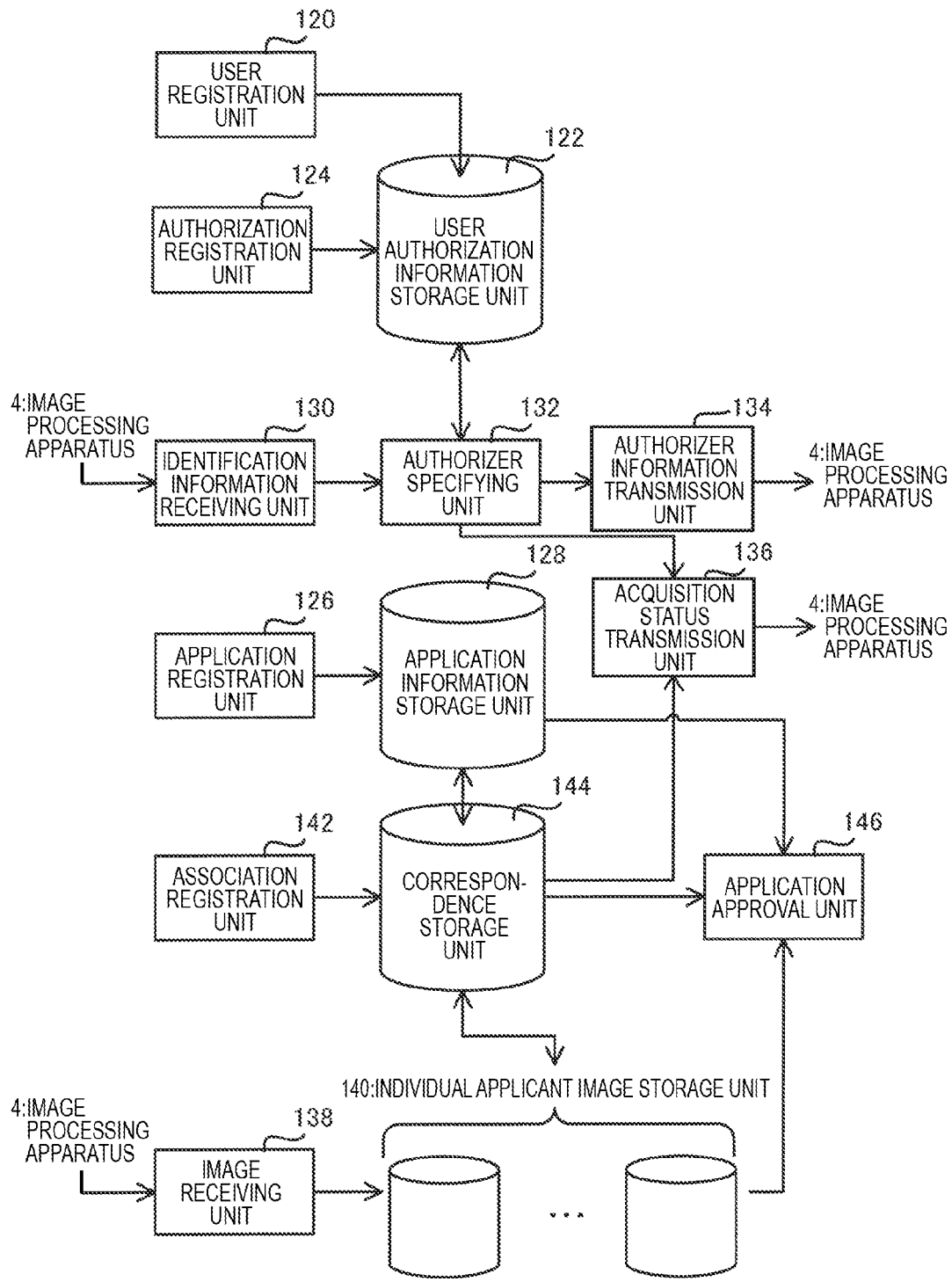
FIG. 8 is a block diagram schematically showing a functional configuration of the application processing apparatus 6, which is implemented by a program being executed, according to the first embodiment of the invention.

FIG. 8 is a block diagram showing a functional configuration of the application processing apparatus 6 which is implemented by a program being executed.

The application processing apparatus 6 according to the embodiment includes a user registration unit 120, a user authorization information storage unit 122, an authorization registration unit 124, an application registration unit 126, an application information storage unit 128, an identification information receiving unit 130, an authorizer specifying unit 132, an authorizer information transmission unit 134, an acquisition status transmission unit 136, an image receiving unit 138, an individual applicant image storage unit 140, an association registration unit 142, a correspondence storage unit 144, and an application approval unit 146 as shown in FIG. 8.

The user registration unit 120 registers information about the user of the application processing apparatus 6. According to the embodiment, the user registration unit 120 stores identification information and the like of the applicant, the person who proceeds with the application procedure instead (authorized person), the person who approves the application (approver), and the like on the user authorization information storage unit 122.

The authorization registration unit 124 registers information about the authorized person who is authorized to proceed with the procedure for the application approval processing relating to the applicant (authorizer). According to the embodiment, the authorization registration unit 124 stores identification information of a user as a target of authorization (authorized person) for each authorizer on the user authorization information storage unit 122. As described above, information indicating correspondence between the authorizer and the authorized person is stored on the user authorization information storage unit 122. In addition, the authorization registration unit 124 may further register information about the authority of the authorized person to proceed with the procedure instead. For example, the authorized person may be authorized to acquire only an image, or may be authorized to acquire the image and request approval.

The user authorization information storage unit 122 stores the information which is registered by the user registration unit 120 and the authorization registration unit 124.

The application registration unit 126 registers information about an application. According to the embodiment, the application registration unit 126 stores information about an expense adjustment application on the application information storage unit 128. For example, the application registration unit 126 registers information, such as a date, a purpose of the expense, and a price, as information about the expense adjustment application.

The application information storage unit 128 stores information of applications for each user as an applicant.

The identification information receiving unit 130 receives the identification information of the user, which is transmitted from the image processing apparatus 4. Specifically, the identification information which is transmitted from the identification information transmission unit 72 in the image processing apparatus 4 is received.

The authorizer specifying unit 132 specifies the authorizer who authorizes the user of the identification information, which is received by the identification information receiving unit 130, to proceed with the procedure based on the information registered by the authorization registration unit 124. For example, the authorizer specifying unit 132 specifies the authorizer by searching for the authorizer who authorizes the user from the information which indicates the correspondence between the authorizer and the authorized person and is stored on the user authorization information storage unit 122.

The authorizer information transmission unit 134 transmits the information about the authorizer who is specified by the authorizer specifying unit 132. According to the embodiment, the authorizer information transmission unit 134 transmits the identification information of the authorizer as the information about the authorizer. In addition, the authorizer information transmission unit 134 may also transmit the information about the authority of the authorized person to proceed with the procedure instead.

The acquisition status transmission unit 136 transmits the acquisition status of the evidential document image to be referred to for the application approval processing. According to the embodiment, the acquisition status transmission unit 136 transmits information about whether or not the image of the receipt required for approving the expense adjustment application has been acquired, to the image processing apparatus 4. Here, the acquisition status transmission unit 136 according to the embodiment transmits, as an acquisition status, information about whether or not there is an application for which a receipt has not yet been submitted from among applications of the authorizer, for each user and each authorizer specified by the authorizer specifying unit 132, for example. The acquisition status transmission unit 136 determines whether or not there is an application for which a receipt has not yet been submitted from among the applications of each user and each authorizer, based on the information about the correspondence between the applications and evidential document images for the applications, which is stored on the correspondence storage unit 144 as will be described later, and transmits the determination result.

The image receiving unit 138 receives the image as the evidential document relating to the authorizer, the information of which is transmitted from the authorizer information transmission unit 134. According to the embodiment, the image receiving unit 138 determines which of the authorizers the image corresponds to based on the transmission information from the image transmission unit 84 in the image processing apparatus 4, and stores the image as an image of a receipt of the determined authorizer on the individual applicant image storage unit 140.

The individual applicant image storage unit 140 stores the image data as the evidential document relating to the application for each applicant. According to the embodiment, the individual applicant image storage unit 140 stores images of receipts on a storage region separately provided for each applicant.

The association registration unit 142 associates the information relating to the application which is stored on the application information storage unit 128 with the image which is stored on the individual applicant image storage unit 140 in response to an instruction by an input operation via the input and output device 108 or an instruction from the terminal apparatus 8. In addition, the association registration unit 142 stores information indicating the correspondence therebetween on the correspondence storage unit 144. For example, the applicant or the authorized person who is authorized by the application provides an instruction for the association by using the terminal apparatus 8, and the association registration unit 142 performs the association based on the instruction.

The correspondence storage unit 144 stores information indicating the correspondence between the information relating to the application which is stored on the application information storage unit 128 and the image which is stored on the individual applicant image storage unit 140.

The application approval unit 146 performs approval processing of the application which is associated with the image stored on the individual applicant image storage unit 140. According to the embodiment, the application approval unit 146 performs the expense adjustment processing in response to an instruction by an input operation via the input and output device 108 or an instruction from the terminal apparatus 8. For example, the approver checks the application as a target of approval and the receipt for the application by using the terminal apparatus 8 and provides an instruction for the expense adjustment processing if there is no problem.

The terminal apparatus 8 is a computer which has the same configuration as the hardware configuration shown in FIG. 7, and is a terminal which provides instructions for user registration, authorization relationship registration, application registration, registration of correspondence between an application and an evidential document image, an approval request, approval execution, and the like to the application processing apparatus 6 via the network 10. The terminal apparatus 8 provides the aforementioned instructions to the application processing apparatus 6 based on input operations by the user, for example.

Next, a description will be given of operations of the application processing system 2 according to the embodiment.

Figure 9:
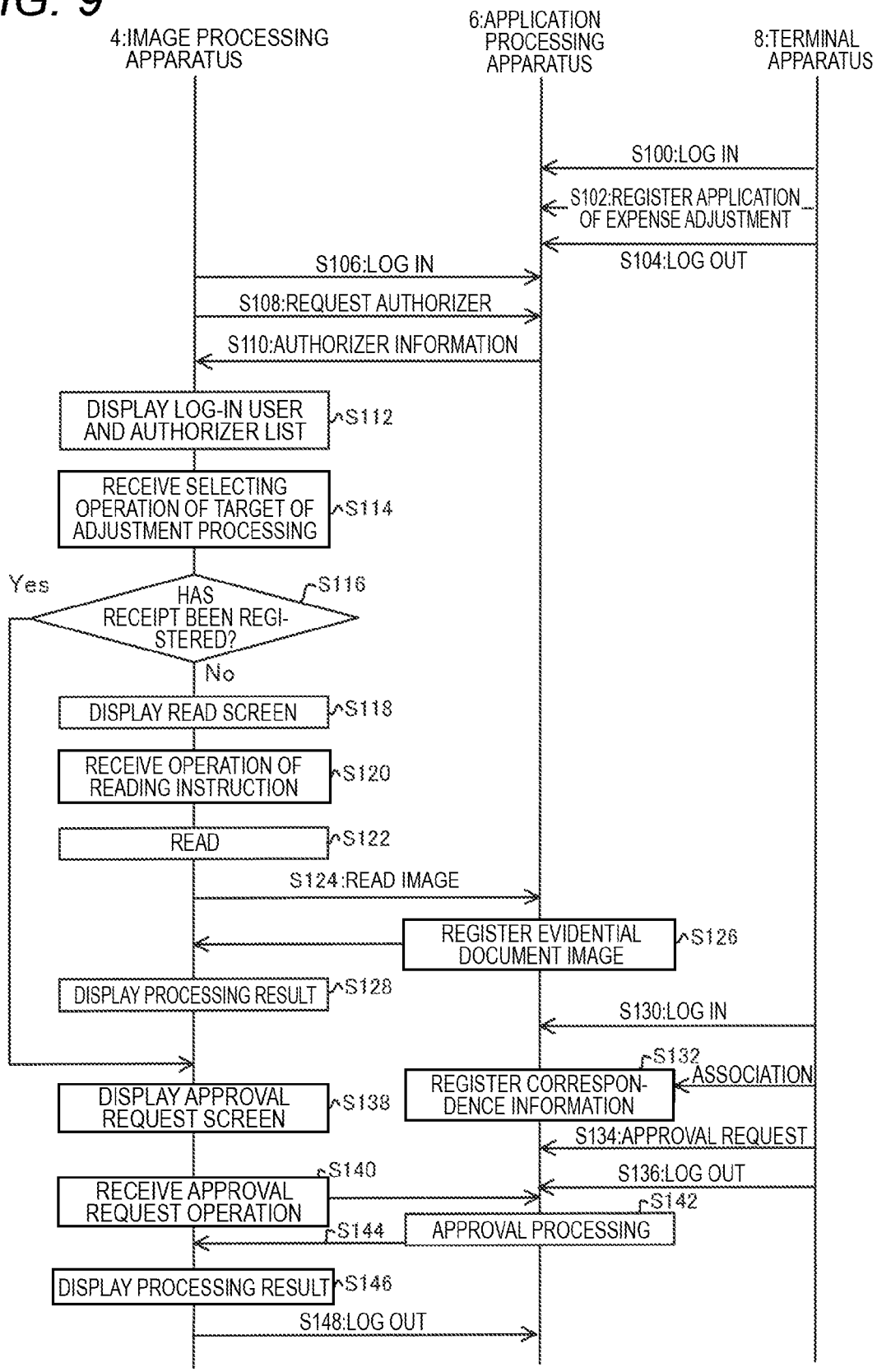
FIG. 9 is a sequence chart showing an example of operations of the application processing system 2 from application registration to approval processing according to the first embodiment.

FIG. 9 is a sequence chart showing an example of operations of the application processing system 2 from application registration to approval processing according to the embodiment.

In Step 100 (S100), an applicant logs in to the application processing apparatus 6 via the terminal apparatus 8. For example, identification information of the applicant, which is inputted to the terminal apparatus 8, is transmitted to the application processing apparatus 6, and if the identification information has already been stored on the user authorization information storage unit, the applicant sufficiently logs in to the application processing apparatus 6.

In Step 102 (S102), information about the application is registered in the application processing apparatus 6 via the terminal apparatus 8. In the application processing apparatus 6, the application registration unit 126 stores the information about the application relating to expense on the application information storage unit 128 based on an instruction provided via the terminal apparatus 8.

In Step 104 (S104), the applicant logs out of the application processing apparatus 6 via the terminal apparatus 8. In Step 100 to Step 104, the applicant may be a subject of the operation, or an authorized person who is authorized by the applicant may be a subject of the operation.

In Step 106 (S106), the authorized person logs in to the application processing apparatus 6 via the image processing apparatus 4. In the image processing apparatus 4, the identification information receiving unit 70 receives identification information of the authorized person who is a user of the image processing apparatus 4, and the identification information transmission unit 72 transmits the identification information to the application processing apparatus 6. If the identification information has already been stored on the user authorization information storage unit, for example, the authorized person successfully logs in to the application processing apparatus 6.

In Step 108 (S108), the image processing apparatus 4 requests the application processing apparatus 6 to provide information about the authorizer who authorizes the authorized person as the user of the image processing apparatus 4 to proceed with the procedure. The request may be made at the same time as when the identification information is transmitted by the identification information transmission unit 72, for example.

In Step 110 (S110), in the application processing apparatus 6, the authorizer specifying unit 132 specifies the authorizer based on the identification information of the authorized person which is received by the identification information receiving unit 130 from the image processing apparatus 4, and the authorizer information transmission unit 134 transmits the specified identification information of the authorizer to the image processing apparatus 4. In contrast, the transmitted identification information is received by the authorizer information receiving unit 74 in the image processing apparatus 4. Here, in Step 110, the acquisition status transmission unit 136 in the application processing apparatus 6 also transmits information about the acquisition status of evidential documents of the authorized person and the authorizer to the image processing apparatus 4.

In Step 112 (S112), in the image processing apparatus 4, the identification information received by the authorizer information receiving unit 74 is displayed on the UI device 11 by the control by the display control unit 76. Here, the acquisition status of the evidential document for the authorizer is transmitted, and the information received by the acquisition status receiving unit 78 is also displayed on the UI device 11.

In Step 114 (S114), in the image processing apparatus 4, selection relating to for whom receipt is acquired for the application (selection of a target of adjustment processing) is made by the selection receiving unit 80 receiving a selecting operation.

In Step 116 (S116), acquisition statuses of evidential documents are determined for the target of adjustment processing who is selected in Step 114, and in a case where evidential document images have already been acquired and associated for all applications of the target of the adjustment processing, the processing proceeds to Step 138. If not, the processing proceeds to Step 118.

In Step 118 (S118), the image processing apparatus 4 displays a screen as shown in FIG. 6 on the UI device 11. In Step 120 (S120), the image processing apparatus 4 moves on to Step 122 by receiving an operation of a reading instruction from the operator.

In Step 122 (S122), the image reading device 14 reads the receipts as evidential documents, and the image acquisition unit 82 acquires image data.

In Step 124 (S124), the image transmission unit 84 transmits the images acquired by the image acquisition unit 82 as evidential documents of the target of the adjustment processing which is selected in Step 114 to the application processing apparatus 6. In a case where an authorizer is selected in Step 114, for example, the image transmission unit 84 transmits the images as evidential documents for the authorizer.

In Step 126 (S126), the image receiving unit 138 stores the received images on the individual applicant image storage unit 140. In a case where an authorizer is selected in Step 114, for example, the image receiving unit 138 stores the images as evidential document images for the authorizer on the individual applicant image storage unit 140. In addition, the image processing apparatus 4 transmits a registration result of the received image (for example, information indicating for whom among applicants the images have been stored and information indicating whether or not the images have successfully been stored) to the image processing apparatus 4.

In Step 128 (S128), the image processing apparatus 4 displays a registration result which is transmitted from the application processing apparatus 6 on the UI device 11. In addition, the image processing apparatus 4 may output the registration result from the printing device 12.

In Step 130 (S130), the applicant or the authorized person logs in to the application processing apparatus 6 via the terminal apparatus 8.

In Step 132 (S132), association between the application to the application processing apparatus 6 and the images of the receipt is registered via the terminal apparatus 8. The association registration unit 142 in the application processing apparatus 6 associates the information relating to the application which is stored on the application information storage unit 128 with the images which are stored on the individual applicant image storage unit 140 in response to the instruction from the terminal apparatus 8 and stores the information indicating the correspondence therebetween on the correspondence storage unit 144.

In Step 134 (S134), information of requesting execution of application approval processing is transmitted to the application processing apparatus 6 via the terminal apparatus 8.

In Step 136 (S136), the applicant or the authorized person logs out of the application processing apparatus 6 via the terminal apparatus 8.

In a case of an application with which images of receipts have already been associated, the request for execution of the approval processing may be made via the image processing apparatus 4. In such a case, the image processing apparatus 4 displays a screen for checking whether or not a request for execution of approval processing is made on the UI device 11 in Step 138 (S138), and if an operation of instructing a request of the execution of the approval processing is received in Step 140 (S140), the request information transmission unit 88 in the image processing apparatus 4 transmits information of requesting the execution of the application approval processing to the application processing apparatus 6. In doing so, the request for the execution of the approval processing is made without moving to the terminal apparatus 8. In the case of the application with which images of receipts has already been associated, the request information transmission unit 88 in the image processing apparatus 4 may automatically transmit the information of requesting the execution of the application approval processing to the application processing apparatus 6 without performing Steps 138 and 140.

In Step 142 (S142), the application processing apparatus 6 performs expense adjustment processing as the approval processing. In a case where the approver checks the application as a target of approval and receipts for the application and provides an instruction for the expense adjustment processing, for example, the application processing apparatus 6 executes the approval processing. In a case where the request for the execution of the approval processing is received from the image processing apparatus 4, the application processing apparatus 6 transmits approval processing result information to the image processing apparatus 4 (Step 144), and the image processing apparatus 4 displays the received result information on the UI device 11 (Step 146). The image processing apparatus 4 may output the received result information to the printing device 12.

In Step 148 (S148), the authorized person logs out of the application processing apparatus 6 via the terminal apparatus 8.

Next, a description will be given of a second embodiment of the invention. The second embodiment is different from the first embodiment mainly in that association of information relating to an application with evidential document images for the application is performed on the side of the image processing apparatus 4 when the evidential document images are acquired.

Figure 10:
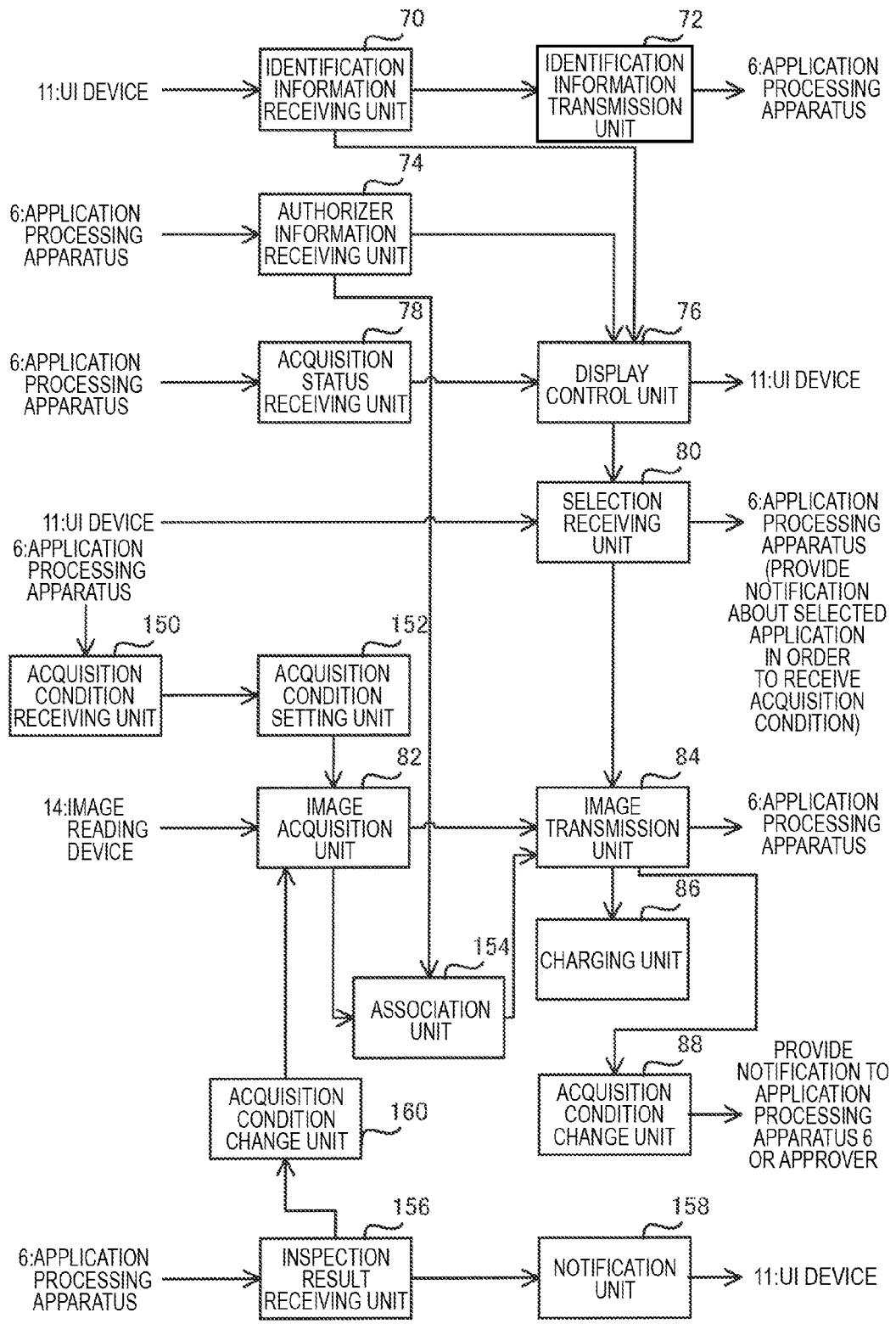
FIG. 10 is a block diagram showing a functional configuration of the image processing apparatus 4, which is implemented by a program being executed, according to a second embodiment.

FIG. 10 is a block diagram showing a functional configuration of the image processing apparatus 4, which is implemented by a program being executed, according to the second embodiment.

In the image processing apparatus 4 according to the second embodiment, an acquisition condition receiving unit 150, an acquisition condition setting unit 152, an association unit 154, an inspection result receiving unit 156, a notification unit 158, and an acquisition condition change unit 160 are added as shown in FIG. 10, as compared with that in the first embodiment shown in FIG. 4. In addition, the second embodiment is different from the first embodiment in the points described below in relation to the authorizer information receiving unit 74, the acquisition status receiving unit 78, the display control unit 76, the selection receiving unit 80, the image acquisition unit 82, and the image transmission unit 84.

Hereinafter, a description will be given of the points which are different from those in the first embodiment.

Although the authorizer information receiving unit 74 receives the identification information of the authorizer as the information relating to the authorizer in the first embodiment, the authorizer information receiving unit 74 receives the following information as the information relating to the authorizer in the second embodiment. That is, the authorizer information receiving unit 74 receives information about an application of the authorizer who authorizes the user of the identification information, which is received by the identification information receiving unit 70, to proceed with the procedure necessary for the application approval processing. In addition, the authorizer information receiving unit 74 may further receive information about an application of the user of the identification information which is received by the identification information receiving unit 70.

Although the acquisition status receiving unit 78 receives the acquisition status of each authorizer in the first embodiment, the acquisition status receiving unit 78 according to the second embodiment receives acquisition status of images for each application which is received by the authorizer information receiving unit 74.

The display control unit 76 according to the second embodiment controls the UI device 11 as the display device to display the information about the application which is received by the authorizer information receiving unit 74.

FIG. 11 is a diagram schematically showing an example of a display screen of the UI device 11, which is displayed by being controlled by the display control unit 76, according to the second embodiment. In the example shown in FIG. 11, information about applications of the authorizer BBB who authorizes the operator AAA of the image processing apparatus 4 are displayed. In FIG. 11, a displayed image 170 represents the applications of the authorizer BBB, a displayed image 172 represents that an evidential document image for the application has not yet been acquired, and a displayed image 174 represents that an evidential document image for the application has already been acquired. Here, the display control unit 76 may perform control so as to display an application, for which an evidential document image has not yet been acquired according to an acquisition status, with priority.

The selection receiving unit 80 according to the second embodiment receives a selecting operation performed on an application, which is being displayed by the display control unit 76, via the UI device 11. The operator selects for which of the applications images of receipts are to be acquired from a list of the applications being displayed as shown in FIG. 11. In addition, the selection receiving unit 80 provides notification about which application has been selected to the application processing apparatus 6.

Figure 14:
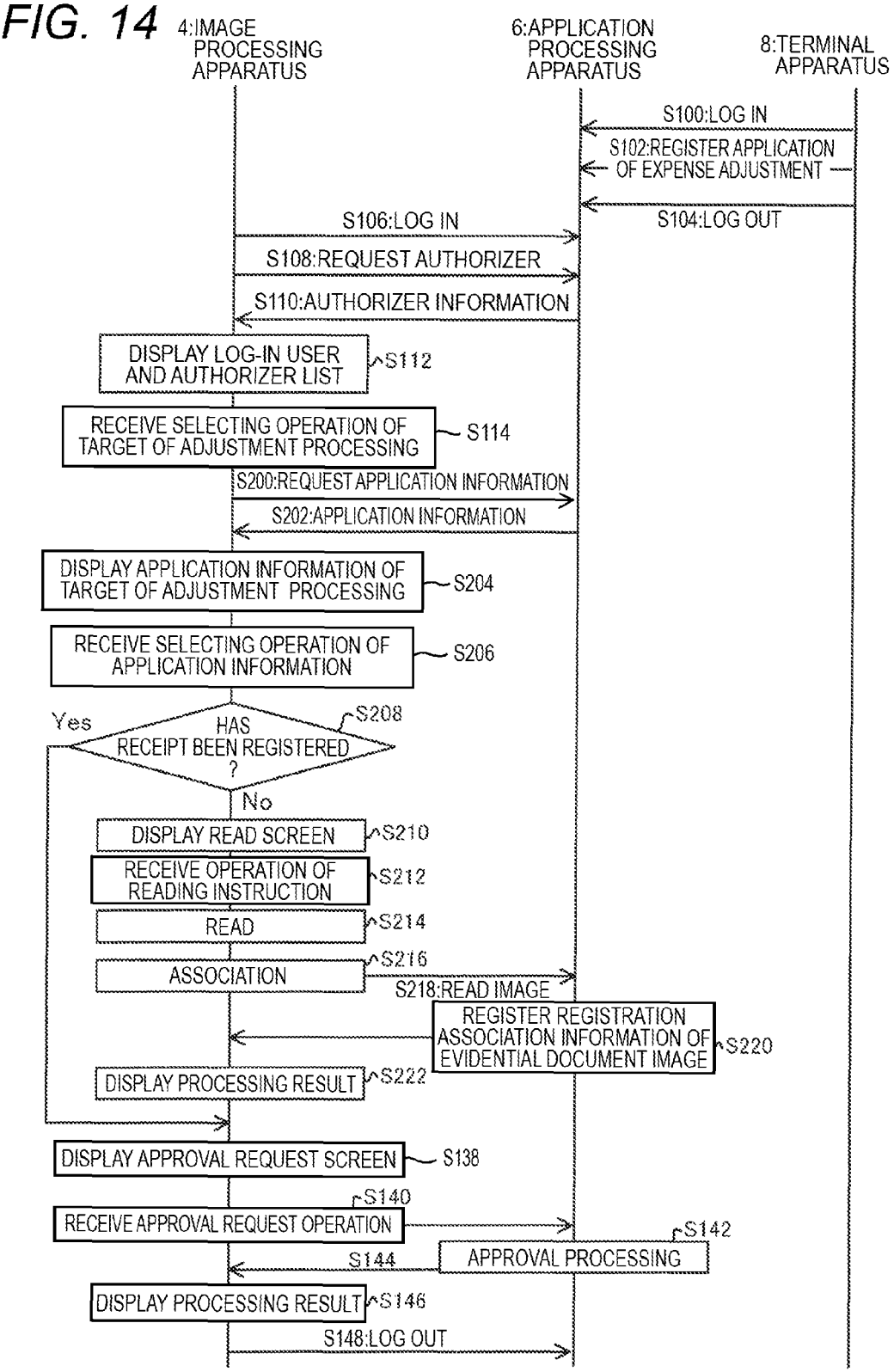
FIG. 14 is a sequence chart showing an example of operations of the application processing system 2 from the application registration to the approval processing according to the second embodiment.

According to the second embodiment, the following configuration may be employed as shown in FIG. 14 which will be described later. A configuration is applicable in which the authorizer information receiving unit 74 receives identification information of the authorizer who authorizes the operator to proceed with the procedure first, the display control unit 76 displays the received identification information of the authorizer, the selection receiving unit 80 receives a selecting operation of a target of the adjustment processing, the authorizer information receiving unit 74 then receives information about applications of the selected target of the adjustment processing, the display control unit 76 displays the received information about the applications, and the selection receiving unit 80 receives a selecting operation of an application.

The acquisition condition receiving unit 150 receives a condition, under which the image acquisition unit 82 acquires images, from the application processing apparatus 6. Specifically, the acquisition condition receiving unit 150 receives information about a reading condition of the image reading device 14, for example. According to the embodiment, the acquisition condition receiving unit 150 receives an acquisition condition in accordance with content of the application which is designated by the selecting operation received by the selection receiving unit 80. In addition, a detailed description will be given of the acquisition condition in accordance with the content of the application.

The acquisition condition setting unit 152 sets the acquisition condition which is received by the acquisition condition receiving unit 150. Specifically, the acquisition condition setting unit 152 sets the reading condition of the image reading device 14 based on the reading condition which is received by the acquisition condition receiving unit 150. Although the configuration in which the acquisition condition in accordance with the content of the application designated by the selecting operation received by the selection receiving unit 80 is received from the application processing apparatus 6 is exemplified in the embodiment, the image processing apparatus 4 itself may determine a reading condition in accordance with the content of the application and set the reading condition as the reading condition of the image reading device 14.

The image acquisition unit 82 acquires evidential document image in accordance with the acquisition condition set by the acquisition condition setting unit 152. FIG. 12 is a diagram schematically showing an example of a setting screen displayed on the UI device 11 when the image reading device 14 reads the evidential document. In the example shown in FIG. 12, a setting screen of a reading condition of the receipt for the application which is designated by the selecting operation received by the selection receiving unit 80 is described.

The association unit 154 associates the information about the application which is received by the authorizer information receiving unit 74 with the image acquired by the image acquisition unit 82. According to the embodiment, the association unit 154 associates the application, which is designated by the selecting operation received by the selection receiving unit 80, from among the applications received by the authorizer information receiving unit 74 with the image acquired by the image acquisition unit 82.

The image transmission unit 84 according to the second embodiment transmits the image, which is acquired by the image acquisition unit 82, as an evidential document for the application associated by the association unit 154. Specifically, the image transmission unit 84 transmits the image which is acquired by the image acquisition unit 82 and the information indicating the correspondence made by the association unit 154 to the application processing apparatus 6.

In addition, the inspection result receiving unit 156 receives, from the application processing apparatus 6, an inspection result about whether or not the image associated with the application by the association unit 154 meets a condition which is determined in advance for the evidential document of the application.

The notification unit 158 provides notification of the inspection result which is received by the inspection result receiving unit 156. For example, the inspection result may be displayed on the UI device 11, or sound notification or the like may be provided. In addition, the inspection result may be output from the printing device 12.

The acquisition condition change unit 160 changes the condition, under which the image acquisition unit 82 acquired the image, based on the inspection result of the inspection result receiving unit 156. Specifically, in a case where the image associated with the application by the association unit 154 does not meet the condition which is determined in advance for the evidential document of the application, the acquisition condition change unit 160 changes the acquisition condition to a condition required for meeting the condition determined in advance.

In a case where there is a condition that the acquired image should have a resolution that is high enough to recognize characters in OCR (Optical Character Reader) processing by the application processing apparatus 6, and an inspection result indicating that the resolution of the image is lower than the lever determined by the condition is obtained, change is made so as to increase the resolution of the image from the current setting. In a case where a color image is required as a condition, and the acquired image is a monochrome image which does not meet the condition according to the inspection result, for example, the reading condition is changed to a condition of reading a color image.

Although the inspection result is received by the inspection result receiving unit 156 in the above description, the image processing apparatus 4 itself may have an inspection function.

Next, a description will be given of the application processing apparatus 6 according to the second embodiment.

Figure 13:
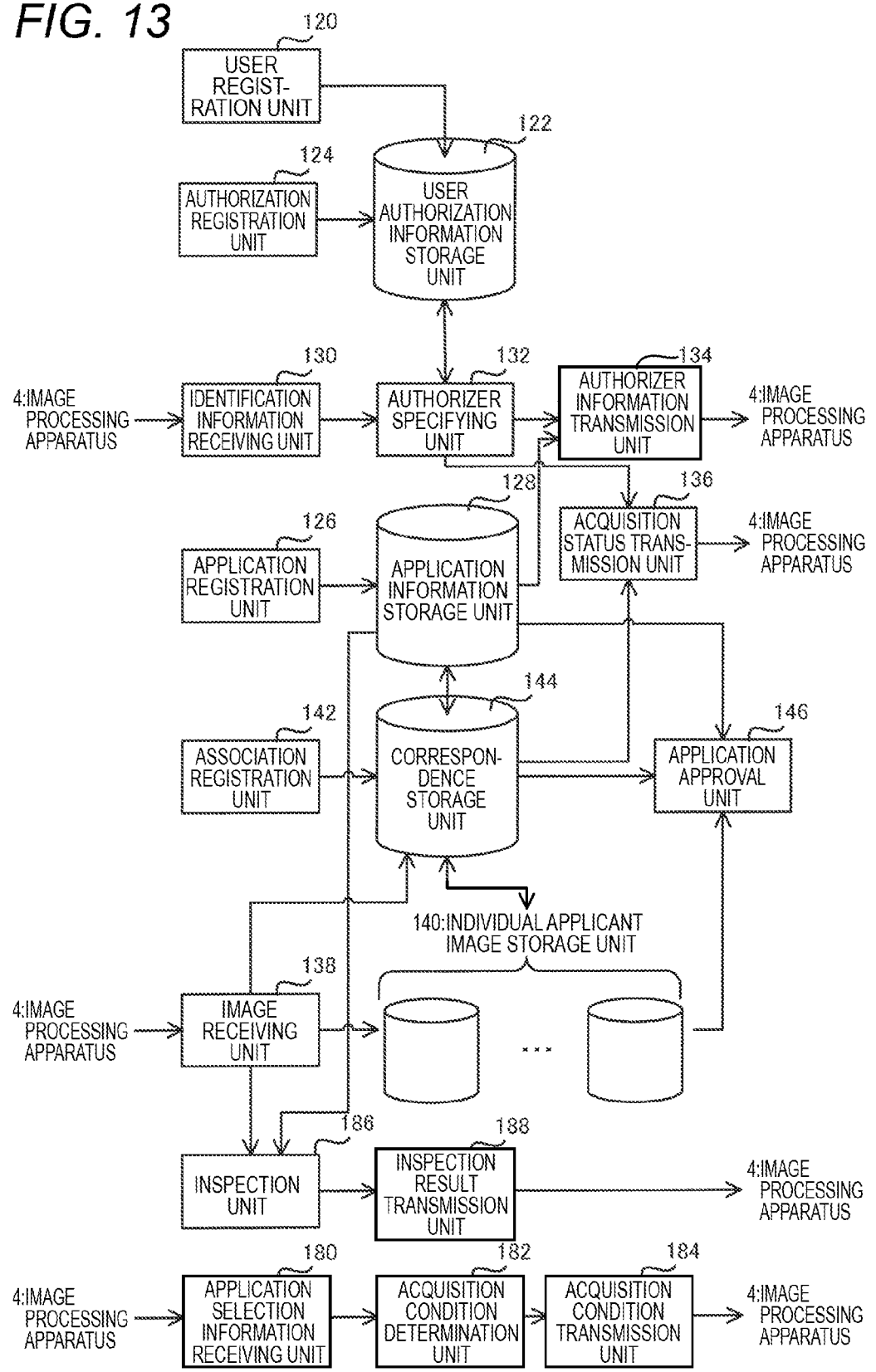
FIG. 13 is a block diagram showing a functional configuration of the application processing apparatus 6, which is implemented by a program being executed, according to the second embodiment.

FIG. 13 is a block diagram showing a functional configuration of the application processing apparatus 6, which is implemented by a program being executed, according to the second embodiment.

In the application processing apparatus 6 according to the second embodiment, an application selection information receiving unit 180, an acquisition condition determination unit 182, an acquisition condition transmission unit 184, an inspection unit 186, and an inspection result transmission unit 188 are added as shown in FIG. 13 as compared with the first embodiment shown in FIG. 8. In addition, the second embodiment is different from the first embodiment in the points described below in relation to the authorizer information transmission unit 134, the acquisition status transmission unit 136, and the image receiving unit 138.

The authorizer information transmission unit 134 according to the second embodiment transmits information about an application of a specified authorizer as information relating to the authorizer who is specified by the authorizer specifying unit 132. In addition, the authorizer information transmission unit 134 may transmit information about an application of the user of the identification information, which is received by the identification information receiving unit 130, in addition to or instead of the information about the application of the authorizer specified by the authorizer specifying unit 132. Moreover, the authorizer information transmission unit 134 may transmit information about an application of a target of adjustment processing, which is requested by the image processing apparatus 4, regardless of the specification by the authorizer specifying unit 132.

The acquisition status transmission unit 136 according to the second embodiment transmits an acquisition status of an image for each application of the authorizer or the user, which is transmitted by the authorizer information transmission unit 134.

The application selection information receiving unit 180 receives information about which of applications is designated by the selection received by the selection receiving unit 80 in the image processing apparatus 4.

The acquisition condition determination unit 182 determines an acquisition condition in accordance with content of the application which is specified by the result of the reception by the application selection information receiving unit 180. According to the embodiment, the acquisition condition determination unit 182 determines an acquisition condition in accordance with content of the application based on a predetermined rule. For example, acquisition of a color image with a resolution of 300 dpi is determined as an acquisition condition for an application for which there is a rule of attaching a revenue stamp to a receipt (for example, an application for a price which is equal to or greater than a predetermined price or an application for a predetermined purpose), and acquisition of a monochrome image with a resolution of 200 dpi is determined as an acquisition condition for other applications. In addition, acquisition of images on both sides of a receipt may be determined as an acquisition condition for an application with predetermined content.

The acquisition condition transmission unit 184 transmits the acquisition condition determined by the acquisition condition determination unit 182 to the image processing apparatus 4.

In addition, the image receiving unit 138 according to the second embodiment receives the evidential document image associated with the application, the information of which is transmitted by the authorizer information transmission unit 134, from the image processing apparatus 4. According to the embodiment, the image receiving unit 138 receives the image data which is transmitted by the image transmission unit 84 in the image processing apparatus 4 and information indicating correspondence between the image data and the application. In addition, the image receiving unit 138 stores the received image data on the individual applicant image storage unit 140 and stores the received information indicating the correspondence on the correspondence storage unit 144.

The inspection unit 186 inspects whether or not the image which is received by the image receiving unit 138 meets the condition determined in advance for the evidential document.

For example, the inspection unit 186 may inspect whether or not content of the image which is received by the image receiving unit 138 overlaps with content of another image which has already been associated with an application that is different from the application associated with the image. In doing so, improper usage of the same receipt for plural applications for adjustment processing is found. For example, the inspection unit 186 may inspect whether or not the content of the image associated with the application is suitable for the content of the application. For example, the inspection unit 186 may inspect whether or not prices, dates, and the like on the receipt and the application of the adjustment processing coincide with each other.

The inspection result transmission unit 188 transmits information about the result of the inspection by the inspection unit 186 to the image processing apparatus 4.

Next, a description will be given of operations of the application processing system 2 according to the second embodiment.

FIG. 14 is a sequence chart showing an example of operations of the application processing system 2 from the application registration to the approval processing according to the second embodiment. Since Step 100 to Step 114 and Step 138 to Step 148 are the same as those in the first embodiment, the descriptions thereof will be omitted in the following description.

After Step 114, a request for the information about the application of the target of the adjustment processing, which is designated by the selection operation received by the selection receiving unit 80, is made to the application processing apparatus 6 in Step 200 (S200).

In Step 202 (S202), the authorizer information transmission unit 134 in the application processing apparatus 6 transmits the requested information about the application of the target of the adjustment processing to the image processing apparatus 4. On the other hand, the authorizer information receiving unit 74 in the image processing apparatus 4 receives the information about the application. Here, in Step 202, the acquisition status transmission unit 136 in the application processing apparatus 6 also transmits the information about the evidential document acquisition status to the image processing apparatus 4, and the acquisition condition transmission unit 184 in the application processing apparatus 6 also transmits the acquisition condition for each application.

In Step 204 (S204), the display control unit 76 controls the UI device 11 to display the information about the application, which is received by the authorizer information receiving unit 74.

In Step 206 (S206), the selection receiving unit 80 receives the selecting operation performed on the application being displayed by the display control unit 76. At this time, the acquisition condition receiving unit 150 receives the condition, under which the image acquisition unit 82 acquired the image, from the acquisition condition transmission unit 184 in the application processing apparatus 6 for the selected application. The received image acquisition condition is set by the acquisition condition setting unit 152 for the application.

In Step 208 (S208), the acquisition status of the evidential document for the application, which is specified in Step 206, is determined, and if the evidential document image has already been acquired, the processing proceeds to Step 138. If not, the processing moves on to Step 210.

In Step 210 (S210), the image processing apparatus 4 displays a screen as shown in FIG. 12 on the UI device 11.

In Step 212 (S212), the image processing apparatus 4 receives an operation of a reading instruction from the operator and then moves on to Step 214.

In Step 214 (S214), a receipt as an evidential document is read by the image reading device 14, and the image acquisition unit 82 acquires image data. At this time, the image acquisition unit 82 acquires the image under the acquisition condition set by the acquisition condition setting unit 152.

In Step 216 (S216), the association unit 154 associates the application which is designated by the selecting operation received by the selection receiving unit 80 with the image which is acquired by the image acquisition unit 82.

In Step 218 (S218), the image transmission unit 84 transmits the image, which is acquired by the image acquisition unit 82, as the evidential document for the application associated by the association unit 154.

In Step 220 (S220), the image receiving unit 138 in the application processing apparatus 6 receives the image data which is transmitted by the image processing apparatus 4 and the information indicating the correspondence between the image data and the application, stores the image data on the individual applicant image storage unit 140, and stores the information indicating the correspondence on the correspondence storage unit 144. In such a case, it is not necessary for the terminal apparatus 8 to associate the image data with the application. In addition, the inspection unit 186 inspects whether or not the image which is received by the image receiving unit 138 meets the condition determined in advance for the evidential document, and the inspection result transmission unit 188 transmits the inspection result to the image processing apparatus 4.

In Step 222 (S222), the image processing apparatus 4 displays the inspection result which is transmitted by the application processing apparatus 6 on the UI device 11. In addition, the image processing apparatus 4 may output the inspection result by the printing device 12.

Although the case where there is an authorizer who authorizes the operator of the image processing apparatus 4 to proceed with the procedure is exemplified as described above in the second embodiment, the authorization relationship is not necessarily present. That is, the operator may perform the operation in order to acquire an evidential document image for their own application. In such a case, the aforementioned authorizer information transmission unit 134 functions as an application information transmission unit which transmits information relating to the application of the operator themselves, and the authorizer information receiving unit 74 functions as an application information receiving unit which receives the information relating to the application of the operator themselves.

Although the system which performs application processing was described in the aforementioned embodiments, the present invention is not limited to the application processing and may be applied to any system as long as the system processes a case, and the content of the processing is not limited. For example, the invention may be applied to any processing as long as an image relating to a case is referred to for the processing for each of processing target cases. In such a case, the authorizer corresponds to a person who authorizes an authorized person to proceed with a procedure for processing the case.

INDUSTRIAL APPLICABILITY

The image processing apparatus, the case processing apparatus, the case processing system, the program, the image processing method, the case processing method, and the computer-readable medium according to the invention are effectively used in a system which performs expense adjustment processing which requires image for evidential document.

Although the detailed description was given of the invention with reference to the specific embodiments, it will be apparent for those skilled in the art that various modifications and amendments can be added without departing from the spirit and the scope of the invention.

The present application is based on Japanese Patent Application (JP-A-2013-046392) filed Mar. 8, 2013, entire of which is incorporated herein for reference.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising at least one hardware processor configured to implement:
   an identification information receiving unit that receives identification information of an agent who was requested in advance from an applicant to proceed with at least a part of an application procedure for processing a case relating to the applicant instead, the application procedure requesting an approval by an approver;
   an authorizer information receiving unit that receives, based on the received identification information of the agent, information about the applicant who requested in advance the agent of the received identification information to proceed with the application procedure instead;
   an image acquisition unit that acquires an image based on an operation by the applicant or the agent; and
   a transmission unit that transmits the acquired image based on the operation by the applicant or the agent, wherein, in a case where the acquired image is based on the operation by the agent and the operation by the agent is made for the applicant, the transmission unit transmits the acquired image as an image relating to the applicant based on a transmission instruction from the agent for storage in a storage region for the applicant.

2. The image processing apparatus according to claim 1, further comprising:
   a display unit,
   wherein the at least one hardware processor is further configured to implement:
      a display control unit that controls the display unit to display the information which is received by the authorizer information receiving unit; and
      a selection receiving unit that receives a selecting operation which is performed on the information being displayed by the display control unit, and
   wherein the transmission unit transmits the image which is acquired by the image acquisition unit as an image relating to the applicant specified based on the information which is selected by the operation received by the selection receiving unit.

3. The image processing apparatus according to claim 2, wherein the at least one hardware processor is further configured to implement:
   an acquisition status receiving unit that receives information relating to an acquisition status of an image for a case,
   wherein the display control unit controls the display unit to display the information received by the authorizer information receiving unit and the information relating to the acquisition status of the image for the case, which is received by the acquisition status receiving unit.

4. The image processing apparatus according to claim 3, wherein the display control unit performs control so as to display information, an image for which has not yet been acquired according to the acquisition status received by the acquisition status receiving unit, with priority from among the information received by the authorizer information receiving unit.

5. The image processing apparatus according to claim 1, wherein the at least one hardware processor is further configured to implement:
   a request information transmission unit that transmits information for requesting to process a case for which an image has already been acquired.

6. The image processing apparatus according to claim 1, wherein the at least one hardware processor is further configured to implement:
   an association unit that associates a case relating to the applicant, the information of which is received by the authorizer information receiving unit, with the image acquired by the image acquisition unit,
   wherein the transmission unit transmits the image acquired by the image acquisition unit as an evidential document for the case associated by the association unit.

7. The image processing apparatus according to claim 6, wherein the at least one hardware processor is further configured to implement:
   an acquisition condition setting unit that sets an acquisition condition in accordance with content of a case as a condition under which the image acquisition unit acquires the image.

8. The image processing apparatus according to claim 6, wherein the at least one hardware processor is further configured to implement:

a notification unit that provides notification about a result of inspection for whether or not the image associated with the case by the association unit meets a predetermined condition of the evidential document for the case.

9. The image processing unit according to claim 6, wherein the at least one hardware processor is further configured to implement:
an acquisition condition change unit that changes the image acquisition condition of the image acquisition unit to another acquisition condition required for the image to meet the predetermined condition in a case where the image associated with the case by the association unit does not meet the predetermined condition of the evidential document for the case.

10. The image processing apparatus according to claim 1, wherein the at least one hardware processor is further configured to implement:
a charging unit that charges in accordance with image acquisition by the image acquisition unit.

11. An image processing apparatus comprising at least one hardware processor configured to implement:
an identification information receiving unit that receives identification information of an agent who was requested in advance from an applicant to proceed with at least a part of an application procedure for processing a case relating to the applicant instead, the application procedure requesting an approval by an approver;
a case information receiving unit that receives, based on the received identification information of the agent, information about a case relating to the agent of the received identification information or information about a case relating to an applicant who requested in advance the agent of the received identification information to proceed with the application procedure instead;
an image acquisition unit that acquires an image based on an operation by the applicant or the agent;
an association unit that associates the case of the received information with the acquired image; and
a transmission unit that transmits the acquired image as an evidential document for the associated case, based on the operation by the applicant or the agent,
wherein, in a case where the acquired image is based on the operation by the agent and the operation by the agent is made for the applicant, the transmission unit transmits the acquired image as an image relating to the applicant based on a transmission instruction from the agent for storage in a storage region for the applicant.

12. The image processing apparatus according to claim 11, further comprising:
a display unit,
wherein the at least one hardware processor is further configured to implement:
a display control unit that controls the display unit to display the information about the case which is received by the case information receiving unit; and
a selection receiving unit that receives a selecting operation which is performed on the information about the case being displayed by the display control unit,
wherein the association unit associates the case which is selected by the operation received by the selection receiving unit from among cases, the information of which are received by the case information receiving unit, with the image acquired by the image acquisition unit.

13. A case processing apparatus comprising at least one hardware processor is further configured to implement:
an agent registration unit that registers information about an agent who was requested in advance from an applicant to proceed with at least a part of an application procedure for processing a case relating to the applicant instead, the application procedure requesting an approval by an approver;
an applicant registration unit that registers information about an applicant person who requested in advance the agent of the information registered by the agent registration unit;
an identification information receiving unit that receives identification information of the agent;
an applicant specifying unit that specifies the applicant who requested in advance the agent of the received identification information based on the received identification information of the agent and the information registered by the applicant registration unit;
an applicant information transmission unit that transmits information about the specified applicant;
an image receiving unit that receives an image relating to the applicant of the transmitted information, based on an operation by the applicant or the agent; and
a case processing unit that processes a case relating to the received image, from among cases relating to the applicant of the transmitted information,
wherein, in a case where the received image is based on the operation by the agent and the operation by the agent is made for the applicant, the image receiving unit receives the image as an image relating to the applicant based on an instruction from the agent for storage in a storage region for the applicant.

14. The case processing apparatus according to claim 13, wherein the at least one hardware processor is further configured to implement:
an image acquisition condition transmission unit that transmits an image acquisition condition in accordance with content of the case relating to the applicant, the information of which is transmitted by the applicant information transmission unit.

15. The case processing apparatus according to claim 13, wherein the at least one hardware processor is further configured to implement:
an inspection unit that inspects whether or not the image received by the image receiving unit meets a predetermined condition.

16. The case processing apparatus according to claim 15, wherein the inspection unit inspects whether or not content of the image received by the image receiving unit overlaps with content of another image associated with the case.

17. The case processing apparatus according to claim 15, wherein the inspection unit inspects whether or not content of the image associated with the case is suitable for content of the case.

18. An image processing method causing a computer to execute a process comprising:
receiving identification information of an agent who was requested in advance from an applicant to proceed with at least a part of an application procedure for processing a case relating to the applicant instead, the application procedure requesting an approval by an approver;

receiving, based on the received identification information of the agent, information about the applicant who requested in advance the agent of the received identification information to proceed with the application procedure instead;

acquiring an image based on an operation by the applicant or the agent; and transmitting the acquired image as an image relating to the applicant based on the operation by the applicant or the agent, wherein, in a case where the acquired image is based on the operation by the agent and the operation by the agent is made for the applicant, the transmitting transmits the acquired image as an image relating to the applicant based on a transmission instruction from the agent for storage in a storage region for the applicant.

19. An image processing method causing a computer to execute a process comprising:

receiving identification information of an agent who was requested in advance from an applicant to proceed with at least a part of an application procedure for processing a case relating to the applicant instead, the application procedure requesting an approval by an approver;

receiving, based on the received identification information of the agent, information about a case relating to the agent of the received identification information or information about a case relating to an applicant who requested in advance the agent of the received identification information to proceed with the application procedure instead;

acquiring an image based on an operation by the applicant or the agent;

associating the case of the received information with the acquired image; and transmitting the acquired image as an evidential document for the associated case, based on the operation by the applicant or the agent, wherein, in a case where the acquired image is based on the operation by the agent and the operation by the agent is made for the applicant, the transmitting transmits the acquired image as an image relating to the applicant based on a transmission instruction from the agent for storage in a storage region for the applicant.

20. The image processing apparatus according to claim 1, wherein the transmission unit transmits the acquired image as the image relating to the applicant based on the transmission instruction from the agent and based on the received information about the applicant, to proceed with the application procedure for processing the case for the applicant.

* * * * *